Aug. 28, 1956     F. BOGHETTO     2,760,478
EXPLOSION ENGINES
Filed Sept. 30, 1952     2 Sheets-Sheet 1
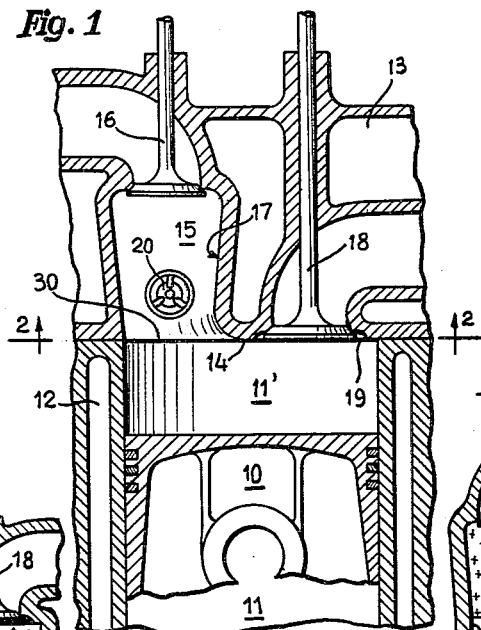
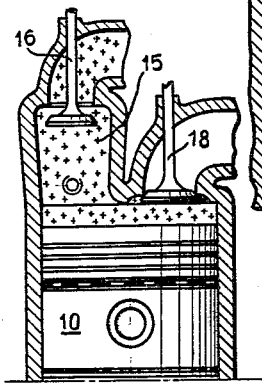
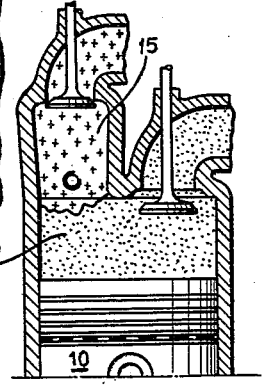
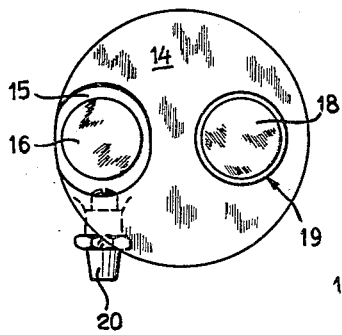
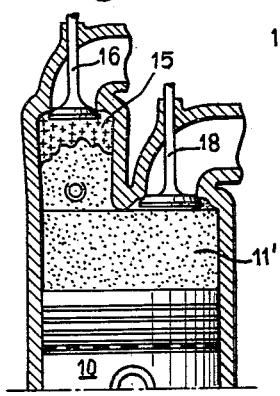
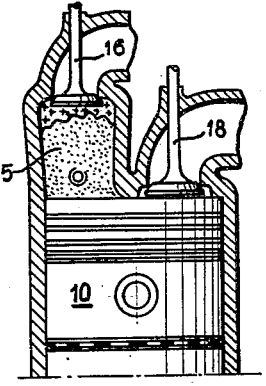
Inventor
Fortunato Boghetto
By Robert E Burns
Attorney Aug. 28, 1956 F. BOGHETTO 2,760,478
EXPLOSION ENGINES
Filed Sept. 30, 1952 2 Sheets-Sheet 2

Inventor
Fortunato Boghetto
By Robert E Burns
Attorney 2,760,478

Patented Aug. 28, 1956

2,760,478

EXPLOSION ENGINES

Fortunato Boghetto, Valdobbiadene, Italy

Application September 30, 1952, Serial No. 312,369

Claims priority, application Italy October 2, 1951

4 Claims. (Cl. 123—191)

This invention relates to spark ignited combustible mixture compressing internal combustion engines and concerns more particularly a cylinder head of that type of engine having at least one overhead valve.

The principal object of this invention is to provide an improved form of head that will enable the compression ratio of the engine to be increased to a maximum within practical limits and at the same time prevent the tendency toward knocking that normally results from an increase in compression ratio.

A further object of this invention is to provide an improved head and a combustion chamber in said head, adapted to insure a satisfactory ignition and combustion of the charge and thereby improve the engine efficiency.

As is well known, the main cause for knocking resides in excessive heating of the walls of the combustion chamber, more particularly of the exhaust valve and region close thereto. The remedy most frequently resorted to consists in suitably cooling the exhaust valve and combustion chamber generally.

This invention is based on the discovery that objectionable knocking may be fully eliminated if one succeeds in interposing between the exhaust valve and fresh mixture during the compression stroke a substantial layer of combustion gas from the previous cycle. This gas layer prevents direct contact between the fresh mixture and exhaust valve, making it practically impossible for the mixture to knock.

In order to carry out this manner of operation in a spark ignited combustible mixture compressing internal combustion engine, the engine head is provided with a combustion chamber in the form of an axially elongated recess, freely communicating with the engine cylinder, the exhaust valve being situated at the bottom of said recess. During the compression stroke all the fresh mixture is pushed by the piston into said recess compressing the combustion residues from the previous cycle against the bottom of the recess where the exhaust valve is situated, thereby creating between the latter and mixture an insulating layer of combustion residues. It will be obvious that this insulating layer cannot be formed in a chamber under anything like turbulence conditions. In order to reach the purpose according to this invention, the wave of the fresh charge should advance within the combustion chamber along a compact front, compressing the residue gases ahead against the bottom of the combustion chamber. Any expert is in a condition to design a chamber substantially free from whirling. According to this invention, the cross section of said chamber is appreciably smaller than the cross section of the cylinder, thereby affording a certain depth of the layer of residue gases during compression. In design, the volume of the combustion chamber is first determined from the given compression ratio. The depth and cross sectional area of the chamber in the form of an axially elongated recess are determined next. It has been found in practice that the best results are obtained with a depth of the recess equalling or, preferably, exceeding the average diameter of the recess, considering as average diameter the arithmetic mean value of the cross dimensions on the recess. According to anti-whirling rules, the recess shall be substantially uniform in section or, at the utmost, slightly diverge towards the bottom and freely communicate with the inside of the cylinder. The expression "freely communicating" means that no restriction exists between the recess and cylinder.

According to a further feature of this invention, the spark plug reaches within the recess at its half portion closer to the cylinder, whereby the spark plug is fully surrounded by fresh mixture during the compression stroke.

The invention shall be better understood from the following description in which reference is made to the drawings given by way of example merely, wherein:

Figure 1 is a section of a spark ignited combustible mixture compressing internal combustion engine provided with the head according to this invention.

Figure 2 is a section on line 2—2 of Figure 1;

Figures 3, 4, 5 and 6 show some stages of the operation of the engine shown in Figures 1 and 2;

Figures 7, 8:
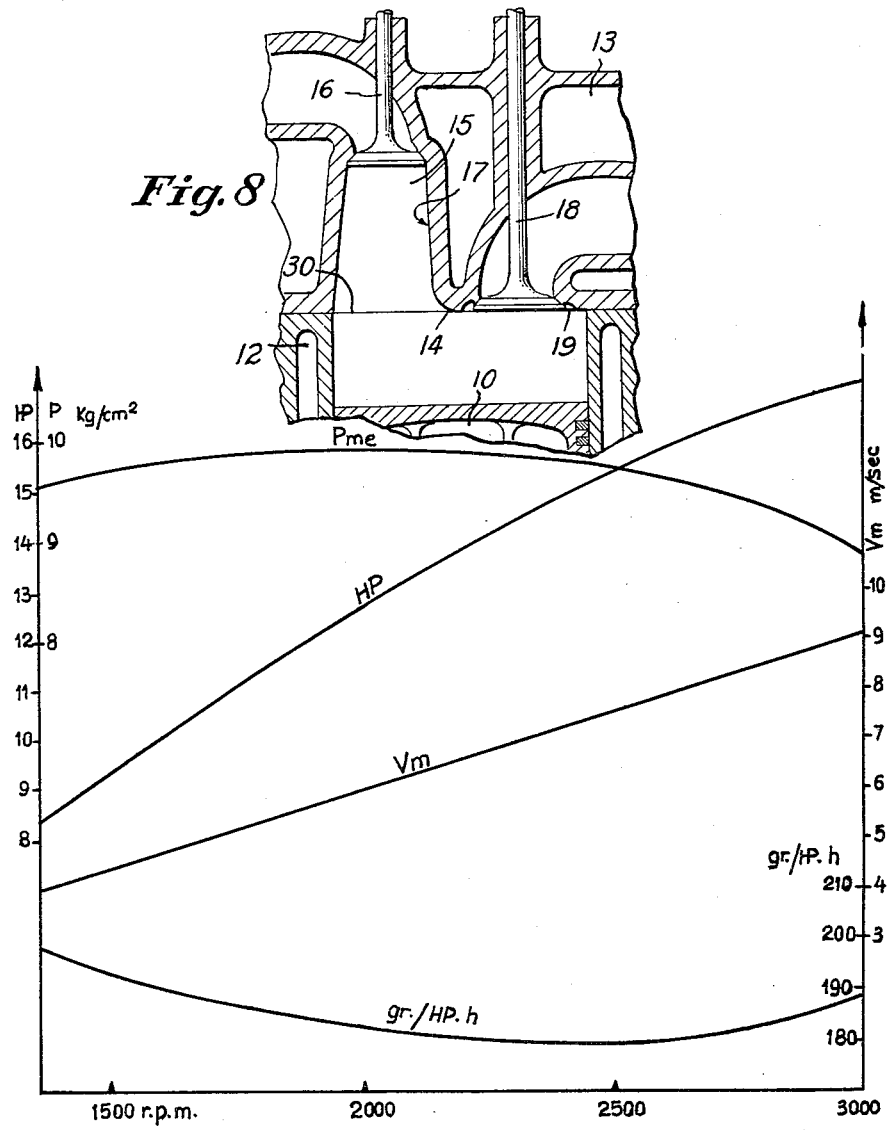
Figure 7 shows the characteristic engine curves.
Figure 8 shows another embodiment of the invention.

In the figures, 10 denotes a reciprocating piston in the working chamber 11' of a cylinder 11 provided, for instance, with a cooling water jacket 12. The cylinder is closed at the top by a head generically denoted by 13 and including a flat cross wall 14 adjacent the chamber 11'. A combustion chamber 15 in the form of an axially elongated recess is also included and an exhaust valve 16 is arranged at the bottom of the recess. As will be seen from the drawing (Figures 1, 2) the recess 15 axial length exceeds its average diameter. In order to eliminate turbulence in the recess 15, the recess is preferbly of elliptical or circular shape, in cross section and its side walls 17 merge into the cross wall 14. It has been found convenient to give to the recess a profile slightly converging towards the cylinder, with a biassing angle not exceeding 10°, preferably of about 7°. The section of the port 30 connecting the recess and working chamber 11' substantially equals the cross section of the recess 15 and is in no case restricted or throttled.

Theoretic calculations show that likewise satisfactory results may be obtained with a recess converging toward the bottom of an angle not exceeding 30° as shown in Fig. 8. In any case, apart from the form of the recess, the ratio between its depth and its average diameter ranges within 1:1 and 2:1.

The engine intake valve 18 closes an intake port 19 bored in the cross wall 14, and is laterally spaced from the recess 15. This arrangement is required in order to avoid any turbulence in the recess 15 during the suction stroke. The side walls 17 of the recess 15 are cooled throughout, the only actually hot part being the exhaust valve 16.

A spark plug 20 extends into the recess 15 and is positioned at the lower portion of the recess closest the cylinder.

The operation of the engine is shown in Figures 3 to 6. At the end of the exhaust stroke (Figure 3) the combustion gases are forced towards the recess 15 and almost fully discharged to the outside. After closure of the exhaust 16 a certain quantity of residue gases remain in the recess 15 and fill the whole volume thereof during the full suction stroke (Figure 4), while the cylinder is filled with fresh mixture. On the compression stroke (Fig. 5) the fresh mixture is forced into the recess 15, without whirling, and compresses against the valve 16 all the residue gases. Assuming the ignition advance is nil, at the end of the compression stroke conditions arise in the recess as shown in Figure 6, under which all the fresh mixture has been forced into the recess 15, the piston 10 having come close the cross wall 14. In practice, however, the mixture is ignited by the spark plug 20 before this condition is reached. Ignition is easily effected and combustion is satisfactory on account of the fact that the fresh mixture is not contaminated by the combustion residues and the spark plug is situated in the half portion of the recess 15 closer to the cylinder.

The presence of a layer of residue gases, between the exhaust valve 16 and fresh mixture can be ascertained by experiments. In fact, if, after a certain period of operation, the electric current is cut off from the spark plug 20, the next compression stroke is not followed by any explosion, denoting the presence at such a layer after the second, third, etc. compression stroke, the mixture is self-ignited indicating the layer has been exhausted and not replenished, self-ignition could continue until the valve 16 has cooled down sufficiently.

In the diagram, P$me$ denotes the mean effective pressure curve; HP denotes the power curve; V$m$ is the average speed of the piston. The lowermost curve denotes the fuel consumption in grams per HP and per hour. The diagram should be understood without further explanations. The advantage of this invention will be obvious from a study of the mean effective pressure and the consumption curves. The engine used in determining the curves was of the type shown in Figures 1 to 6, with a high compression ratio.

Various further modifications may be made without departing from the scope of the invention as defined by the appended claims.

What I claim is:

1. In a spark ignited combustible mixture compressing internal combustion engine the combination of a cylinder, a working chamber within said cylinder, a piston reciprocable within said working chamber, a head closing said working chamber, a recess elongated in a direction parallel to the cylinder axis within said head said recess freely merging at its one end in the working chamber and having at its other end an opening controlled by the exhaust valve of the engine said recess having an axial length not less than its average diameter and having lateral walls converging with respect to its axis at a constant biasing angle from one end to the other so as to comprise a selected configuration to avoid turbulence.

2. In a spark ignited combustible mixture compressing internal combustion engine, a cylinder, a working chamber within said cylinder, a piston reciprocable within said working chamber, a head closing one end of said cylinder, an axially elongated recess within said head in communication with said working space, said recess having an axial length not less than its average diameter and having a selected configuration to avoid turbulence said recess having peripheral walls diverging at an angle not greater than 10° in the direction to its bottom and opening into the working chamber, an exhaust valve opening and closing an exhaust port at the bottom of said recess, said recess having its walls merging into said exhaust port, a spark plug projecting into said recess in the half thereof nearest said working chamber and a combustible mixture inlet valve opening into said working chamber and spaced from said recess.

3. In a spark ignited combustible mixture compressing internal combustion engine, the combination of a cylinder, a working chamber within said cylinder, a piston reciprocable within said working chamber, a head closing said working chamber, a recess elongated in a direction parallel to the cylinder axis within said head, said recess freely merging at its one end in the working chamber and having at its other end an opening controlled by the exhaust valve of the engine, said recess having an axial length not less than its average diameter and having the lateral wall converging in the direction of its end in which the opening controlled by the exhaust valve of the engine is provided, the biasing angle of said wall ranging up to 30°.

4. In an internal combustion engine, the combination of a cylinder, a working chamber within said cylinder, a piston reciprocable within said working chamber, a head closing said working chamber, a flat wall in said head arranged transversely of the cylinder axis and substantially closing said working chamber, an axially elongated tubular recess in said wall having its axis substantially parallel with the axis of the cylinder and freely merging at one end with the working chamber and having at its other end an opening, an exhaust valve for controlling said opening, said recess being elliptical and having an axial length not less than its average diameter and having lateral walls converging with respect to its axis at a constant biasing angle from one end to the other so as to comprise a selected configuration to avoid turbulence, said exhaust valve and said recess having substantially the same diameter so that the walls of said tubular recess are arranged so that said exhaust valve has clearance for reciprocal movement but not a large clearance, and a mixture inlet member opening into said working chamber and spaced from said recess.

References Cited in the file of this patent

UNITED STATES PATENTS

| | | |
|---|---|---|
| 1,187,606 | Brush | June 20, 1916 |
| 1,597,248 | Rathbun | Aug. 24, 1926 |
| 1,865,849 | Gardiner | July 5, 1932 |
| 1,870,397 | Bicknell | Aug. 9, 1932 |
| 1,892,838 | Horning | Jan. 3, 1933 |
| 2,133,592 | Taub | Oct. 18, 1938 |
| 2,442,664 | Roensch | June 1, 1948 |
| 2,658,487 | Basabe | Nov. 10, 1953 |

FOREIGN PATENTS

| | | |
|---|---|---|
| 57,368 | Denmark | Mar. 11, 1940 |
| 623,084 | Great Britain | May 12, 1949 |